United States Patent
Lin (10) Patent No.: US 9,304,354 B2
(45) Date of Patent: Apr. 5, 2016

(54) LIGHT-EMITTING MODULES AND LIGHTING MODULES

(71) Applicant: KUN HSIN TECHNOLOGY INC., Taipei (TW)

(72) Inventor: Kun-Chuan Lin, Taipei (TW)

(73) Assignee: KUN HSIN TECHNOLOGY INC., Taipei (TW)

( * ) Notice: Subject to any disclaimer, the term of this patent is extended or adjusted under 35 U.S.C. 154(b) by 0 days.

(21) Appl. No.: 14/505,767

(22) Filed: Oct. 3, 2014

(65) Prior Publication Data

US 2015/0370130 A1    Dec. 24, 2015

(30) Foreign Application Priority Data

Jun. 19, 2014 (TW) .............................. 103121147 A (51) Int. Cl.
*G02F 1/1335* (2006.01)
*G02F 1/1343* (2006.01)
*G02F 1/1337* (2006.01)

(52) U.S. Cl.
CPC ........ *G02F 1/133603* (2013.01); *G02F 1/1337* (2013.01); *G02F 1/133528* (2013.01); *G02F 1/134309* (2013.01); *G02F 2001/133612* (2013.01)

(58) Field of Classification Search
CPC ..... G02F 1/29; G09F 9/35; E06B 2009/2464; G09G 3/36

See application file for complete search history.

(56) References Cited

U.S. PATENT DOCUMENTS

2006/0082295 A1* 4/2006 Chin ...................... H01L 27/322 313/506
2012/0019434 A1* 1/2012 Kuhlman ............ G02F 1/13306 345/1.3

* cited by examiner

*Primary Examiner* — Anne Hines (57) ABSTRACT

A light-emitting module includes: (a) a liquid-crystal module containing a pair of transparent substrates and a liquid-crystal layer disposed between the pair of transparent substrates; (b) a first light-emitting diode (LED) component disposed on a first side of the liquid-crystal module; (c) a first transparent cover plate over the first LED component such that the first LED component is sandwiched between the liquid-crystal module and the first transparent cover plate; and (d) a control circuit configured to control an on/off frequency of the liquid-crystal module and a light-emitting frequency of the first LED component in such a manner that the light emitted from the first LED component is synchronously shielded by the liquid-crystal module, wherein the light is emitted from a side opposite to the liquid-crystal module.

20 Claims, 8 Drawing Sheets

LIGHT-EMITTING MODULES AND LIGHTING MODULES

CROSS REFERENCE TO RELATED APPLICATIONS

This application claims priority of Taiwan Patent Application No. 103121147, filed on Jun. 19, 2014, the entirety of which is incorporated by reference herein.

TECHNICAL FIELD

The present invention relates to light-emitting modules and lighting modules, and in particular relates to light-emitting modules and lighting modules with liquid-crystal modules.

BACKGROUND

Light-emitting diodes (LEDs) are a semiconductor element, and the LED industry is flourishing due to the advantages of LEDs being light, small, self-illuminating, having quick response speeds, long lifespans and low power consumption. The successful mass production of blue LEDs with high brightness completes the three primary colors required for forming white lights, which broadly extends the application of LEDs.

Now, LEDs are used commonly in daily life in communication and consumer electronics in such application as indicators and information displays. White LEDs bring a new era of lighting, and it is deemed as the biggest and the most potential market for LEDs. Therefore, the primary object for the industry is to develop more products suited to meet consumer demand and expand the lighting applications of LEDs in daily life.

SUMMARY

An embodiment of the present invention provides a light-emitting module, which includes: a liquid-crystal module comprising: a pair of transparent substrates; and a liquid-crystal layer disposed between the pair of transparent substrates; a first light-emitting diode (LED) component disposed on a first side of the liquid-crystal module; a first transparent cover plate over the first LED component such that the first LED component is sandwiched between the liquid-crystal module and the first transparent cover plate; and a control circuit configured to control an on/off frequency of the liquid-crystal module and a first light-emitting frequency of the first LED component in such a manner that the light emitted from the first LED component is synchronously shielded by the liquid-crystal module, wherein the light is emitted from a side opposite to the liquid-crystal module.

An embodiment of the present invention provides a lighting module, which includes: a transparent liquid-crystal module comprising: a pair of transparent substrates; and a liquid-crystal layer disposed between the pair of transparent substrates; a first light-emitting diode (LED) lighting element disposed on a first side of the transparent liquid-crystal module; and a control circuit configured to control an on/off frequency of the transparent liquid-crystal module and a first light-emitting frequency of the first LED lighting component in such a manner that the light emitted from the first LED lighting component is synchronously shielded by the transparent liquid-crystal module, and wherein the transparent liquid-crystal module and the first LED lighting component are separated from each other.

BRIEF DESCRIPTION OF DRAWINGS

The present invention can be more fully understood by reading the subsequent detailed description and examples with references made to the accompanying drawings, wherein.

DETAILED DESCRIPTION

The present invention can be more fully understood by reading the subsequent detailed description and examples with references made to the accompanying drawings. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments. In addition, the present invention may repeat reference numerals and/or letters in the various examples. This repetition is for the purpose of simplicity and clarity and does not in itself dictate a relationship between the various embodiments and/or configurations discussed.

Specific examples of components and arrangements are described below to simplify the present invention. These are, of course, merely examples and are not intended to be limiting. For example, the formation of a first feature over or on a second feature in the description that follows may include embodiments in which the first and second features are formed in direct contact, and may also include embodiments in which additional features can be formed between the first and second features, such that the first and second features may not be in direct contact.

According to common practice, the various features of the drawings are not necessarily to scale. On the contrary, the dimensions of the various features are arbitrarily expanded or reduced for clarity. Moreover, the elements not shown or illustrated in the figures can be any suitable form known by a person having ordinary skill in the art.

LEDs have been widely used in advertisements and billboards in recent years. However, common advertisements and billboards are not transparent devices and they will hinder easy viewing when they are configured to certain windows such as French windows, such that people in the rooms cannot see outside through the windows. There are various problems that may occur even when the advertisements and the billboards are fabricated transparently. For example, (a) the contents of the advertisements and the billboards would be left/right reversed when being observed from behind the advertisement or billboard, which fails to achieve the purpose of advertising or indicating, and (b) people in the rooms may not be able to see the scenes outside because of the light emitted from the LEDs.

In order to solve the problems described above, the present invention provides light-emitting modules and lighting modules which are composed of liquid-crystal modules and LED components, wherein the LED components can be used for the purposes of advertising, indicating or lighting by emitting light, and the liquid-crystal modules are used to synchronously shield the light emitted from the LED components. Then, the people in the rooms in which they are employed not only will not be disturbed by the light emitted from the LED components, but they also can see outside through the windows according to the theory of persistence of vision.

The "on" and "off" of the liquid-crystal modules described herein refer to the phenomenon of shielding light or not shielding light shown by the liquid-crystal modules depending on the application of voltage or not. For examples, the status of the liquid-crystal modules is referred to as "on" if no voltage is applied to form an electrical field, and the light may go through the liquid-crystal modules and emit from another side successfully because the direction of the light will be deflected due to the effect of the liquid-crystal molecules. The status of the liquid-crystal module is referred to as "off" if a voltage is applied to form an electrical field, and the light may not go through the liquid-crystal modules and result in the phenomenon of shielding light because the arrangements of the liquid-crystal molecules will change due to the driving of the electrical field. Moreover, the "on/off frequency" of the liquid-crystal modules described herein refers to the frequency of switching between shielding light and not shielding light shown by the liquid-crystal modules.

The "light-emitting frequency" of the LED components described herein refers to the frequency of switching between emitting light and not emitting light (light and dark) shown by the LED components. Generally, in order to save power, most LED components may switch between emitting light or not (light and dark) at a specific frequency while working without continuously emitting light. If the frequency is higher than 15 Hz, the viewer cannot distinguish the changes between emitting light or not (light or dark) and may feel that the LED components are emitting light continuously.

That the light emitted from the LED components is "synchronously shielded" by the liquid-crystal module described herein refers to the on/off status of the liquid-crystal modules corresponding to the light-emitting phenomenon of the LED components in order to shield the light emitted from the LED components. For example, if the LED components are emitting light (light), the status of the liquid-crystal module is "off" to shield the light emitted from the LEDs; however, if the LED components do not emit light (dark), the status of the liquid-crystal module is "on" and the light is allowed to pass through the liquid-crystal module. Then, the viewer at one side of the liquid-crystal module can see through to the other side.

Using the liquid-crystal module to "shield" the light described herein means that the light is substantially not allowed to pass through the liquid-crystal module; therefore, the viewer at one side of the liquid-crystal module substantially cannot see the shielded light.

Figure 1:
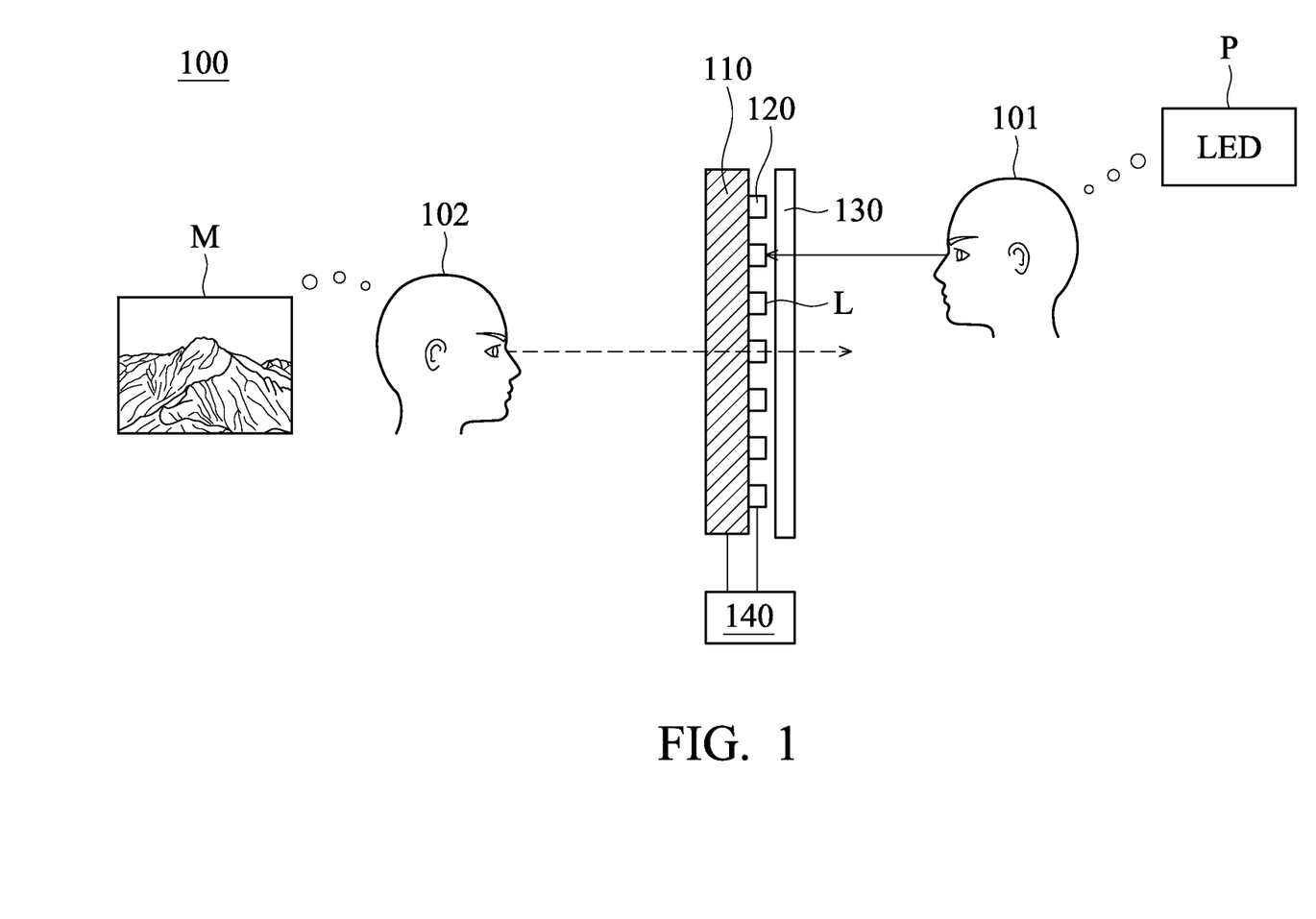
FIG. 1 is a cross-sectional view of a light-emitting module in accordance with an exemplary embodiment of the present invention.

FIG. 1 illustrates a cross-sectional view of a light-emitting module 100 in accordance with an exemplary embodiment of the present invention. The light-emitting module 100 of the embodiment includes: the liquid-crystal module 110, the LED component 120, the transparent cover plate 130 and the control circuit 140, wherein the control circuit 140 is configured to control the on/off frequency of the liquid-crystal module 110 and the light-emitting frequency of the LED component 120 in such a manner that the light emitted from the LED component 120 is synchronously shielded by the liquid-crystal module 110. Therefore, during the working process of the light-emitting module 100, the light L emitted from the LED component 120 or the pattern P shown by the LED component 120 can be observed by the viewer 101 which is closer to the side of the LED component 120. Conversely, the light L emitted from the LED component 120 or the pattern P shown by the LED component 120 may not be observed by the viewer 102 which is closer to a side of the liquid-crystal module 110 (i.e. which is closer to the other side of the LED component 120) such that the viewer 102 may see the scenery M behind the liquid-crystal module 110 continuously without being disturbed by the light emitted from the LED component 120.

More specifically, when the LED component 120 is emitting light, the light L emitted from the LED component 120 or the pattern P shown by the LED component 120 can be directly observed by the viewer 101 which is closer to the side of the LED component 120. At the same time, the liquid-crystal module 110 is "off" to shield the light emitted from the LED component 120; therefore, the light L emitted from the LED component 120 or the pattern P shown by the LED component 120 may not be observed by the viewer 102. When the LED component 120 does not emit light, the liquid-crystal module 110 is "on" and the light may substantially go through thereby. Furthermore, the LED component 120 has a very small size, and the main portion of the LED component 120 is transparent (wherein the semiconductor layer is transparent, and the electrodes are opaque). In this case, the light emitting device 100 may substantially be regarded as a transparent plate or a transparent board. Thus, the viewer 102 which is closer to a side of the liquid-crystal module 110 may see through the liquid-crystal module 110 and see the scenery M behind the liquid-crystal module 110. If the light-emitting frequency of the LED component 120 and the on/off frequency of the liquid-crystal module 110 are higher than 15 Hz, the viewer cannot become aware of the light/dark changes of LED component 120 or the on/off changes of the liquid-crystal module 110 due to the persistence of vision. Thus, the light L emitted from the LED component 120 or the pattern P shown by the LED component 120 can be observed by the viewer 101 continuously, and the viewer 102 may see the scenery M behind the liquid-crystal module 110 continuously without being disturbed by the light emitted from the LED component 120.

Figure 2:
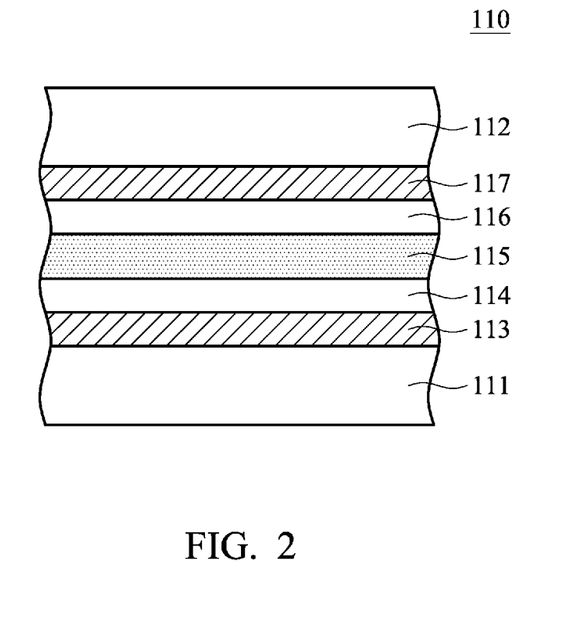
FIG. 2 is a cross-sectional view of a liquid-crystal module in accordance with an exemplary embodiment of the present invention

As described above, the function of the liquid-crystal module 110 is to synchronously shield the light emitted from the LED component 120 in one direction. Those skilled in the art will readily understand that the liquid-crystal module 110 can be any material modules which can be used to synchronously shield the light emitted from the LED component 120. The following description and FIG. 2 illustrates an exemplary embodiment of liquid-crystal module 110. Referring to FIG. 2, the liquid-crystal module 110 includes: a pair of transparent substrates 111/112 and the liquid-crystal layer 115, wherein the liquid-crystal layer 115 is disposed between the transparent substrate 111 and the transparent substrate 112.

The transparent substrates 111/112 can each independently be flexible boards or rigid boards. The transparent substrates 111/112 can be the same material or different materials, wherein the materials include glass, polymer or other suitable materials, wherein the polymer is, for example, polymethyl methacrylate (PMMA), silicone, polyethylene terephthalate (PET), or epoxy resin.

The type of liquid crystal in the liquid-crystal layer 115 includes nematic liquid crystal, smectic liquid crystal, cholesteric liquid crystal, or any other suitable type of liquid crystal. In a preferred embodiment, the type of liquid crystal in the liquid-crystal layer 115 can be nematic liquid crystals, which are more sensitive to applied electrical field.

The on/off status of the liquid-crystal module 110 can be controlled by any suitable methods. For example, the arrangements of the liquid-crystal molecules of the liquid-crystal layer 115 can be changed by the adjustment of the voltage and temperature in order to control the on/off status of the liquid-crystal module 110. In some embodiments, the liquid-crystal molecules of the liquid-crystal layer 115 can be twisted according to the electrical field formed by the applied voltage such that the arrangements of the liquid-crystal molecules can be changed by the adjustment of the voltage, which results in the phenomenon of shielding light or not (i.e. the on/off status of the liquid-crystal module).

The liquid-crystal module 110 can be an active matrix or a passive matrix. In some embodiments, the liquid-crystal module 110 may include a set of electrode layers 113/117, which are respectively disposed between the transparent substrates 111/112 and the liquid-crystal layer 115. The electrode layers 113/117 can be coupled to the control circuit 140 to control the on/off status of the liquid-crystal module 110. The electrode layers 113/117 include transparent conductive materials such as indium tin oxide (ITO), indium zinc oxide (IZO), ZnO-based conductive materials, conductive polymer (PEDOT), carbon nanotubes (CNT), very thin metal layer with a thickness not exceeding 1000 Å, very fine metal net with a line width not exceeding 30 μm, or other transparent conductive materials.

In some embodiments, the liquid-crystal module 110 may include a set of alignment layers 114/116 respectively disposed between the liquid-crystal layer 115 and the electrode layers 113/117. The alignment layers 114/116 can be any alignment layers known in the field. The major function of the alignment layers is to make the liquid-crystal molecules arrange uniformly and provide the liquid materials a liquid-crystal pre-tilt angle to achieve a good performance when twisting. There can be grooves arranged in a specific direction on the surface of the alignment layers to guide the liquid-crystal materials with the intermolecular forces, which results in the alignment of the molecules and makes the liquid-crystal molecules arrange in a specific direction and at a pre-determined pre-tilt angle.

In some embodiments, the liquid-crystal module 110 may further includes a set of polarizers (not shown), which are respectively disposed on the outer surfaces of the transparent substrates 111/112. The polarizers can convert a beam of light of undefined or mixed polarization into a beam with well-defined polarization, polarized light, to give assistance on the light-shielding control of the liquid-crystal module 110.

Referring again to FIG. 1, LED component 120 is disposed on a first side of the liquid-crystal module 110. In some embodiments, LED component 120 is disposed on the transparent substrate 112 (FIG. 2). In some embodiments, LED component 120 is first disposed on the other substrate, and then the substrate is configured to the first side of the liquid-crystal module 110. For example, the substrate with LED component 120 can be attached to the transparent substrate 112 or there is a vacuum or non-vacuum space between the substrate with LED component 120 and the transparent substrate 112, which can avoid the heat produced by the LED component 120 dissipating to the liquid-crystal module 110.

LED component 120 may include packaged LED chips, unpackaged LED chips or other suitable LED structures (please refer to the other application of the Applicant, U.S. patent application Ser. No. 13/567,012, the entirety of which is incorporated by reference herein).

The transparent cover plate 130 is over the LED component 120 such that the LED component 120 is sandwiched between the liquid-crystal module 110 and the transparent cover plate 130. For example, the LED component 120 is sandwiched between the transparent substrate 112 and the transparent cover plate 130. The transparent cover plate 130 can be flexible boards or rigid boards. The transparent cover plate 130 includes glass, polymer or other suitable materials, wherein the polymer is, for example, polymethyl methacrylate (PMMA), silicone, polyethylene terephthalate (PET), or epoxy resin.

The control circuit 140 is coupled to the liquid-crystal module 110 and the LED component 120. The control circuit 140 is configured to control an on/off frequency of the liquid-crystal module 110 and the light-emitting frequency of the LED component 120 in such a manner that the light emitted from the LED component 120 is synchronously shielded by the liquid-crystal module 110. Thus, the light emitted from the LED component 120 is only observed by the viewer at a side opposite to the liquid-crystal module 110. That is, the light emitted from the LED component 120 is emitted from the side opposite to the liquid-crystal module 110. The light L emitted from the LED component 120 is only observed by the viewer 101 which is at the side closer to the LED component 120; the light L emitted from the LED component 120 is not observed by the viewer 102 which is at the side closer to the liquid-crystal module 110 due to the light-shielding effect of the liquid-crystal module 110.

In some embodiments, the on/off frequency of the liquid-crystal module 110 can be the same as the light-emitting frequency of the LED component 120. In some embodiments, the on/off frequency of the liquid-crystal module 110 can be different with the light-emitting frequency of the LED component 120; however, the light emitted from the LED component 120 is still synchronously shielded by the liquid-crystal module 110. For example, when LED component 120 is emitting light, the liquid-crystal module 110 is "off" to shield the light emitted from the LED component, and the duration time of the "off" status shown by the liquid-crystal module is longer than the light-emitting time of the LED component. In an embodiment, the on/off frequency of the liquid-crystal module 110 and light-emitting frequency of the LED component 120 are at least 16 Hz.

The light-emitting module 100 can be used as or attached to windows such as French windows, vitrines, or outer walls. For example, the light-emitting module 100 can be used as or attached to the windows, wherein the side with the LED component 120 toward outdoor and the side with the liquid-crystal module 110 toward indoor. Then, the light emitted from the LED component 120 or the pattern shown by the LED component 120 can be observed by the people outside for the purpose of advertising or indicating. However, the light emitted from the LED component 120 is not observed by the people inside due to the synchronously light-shielding effect of the liquid-crystal module 110. Moreover, the people inside may see the scenery outside of the windows continuously without being disturbed by the light emitted from the LED component 120.

Figure 3:
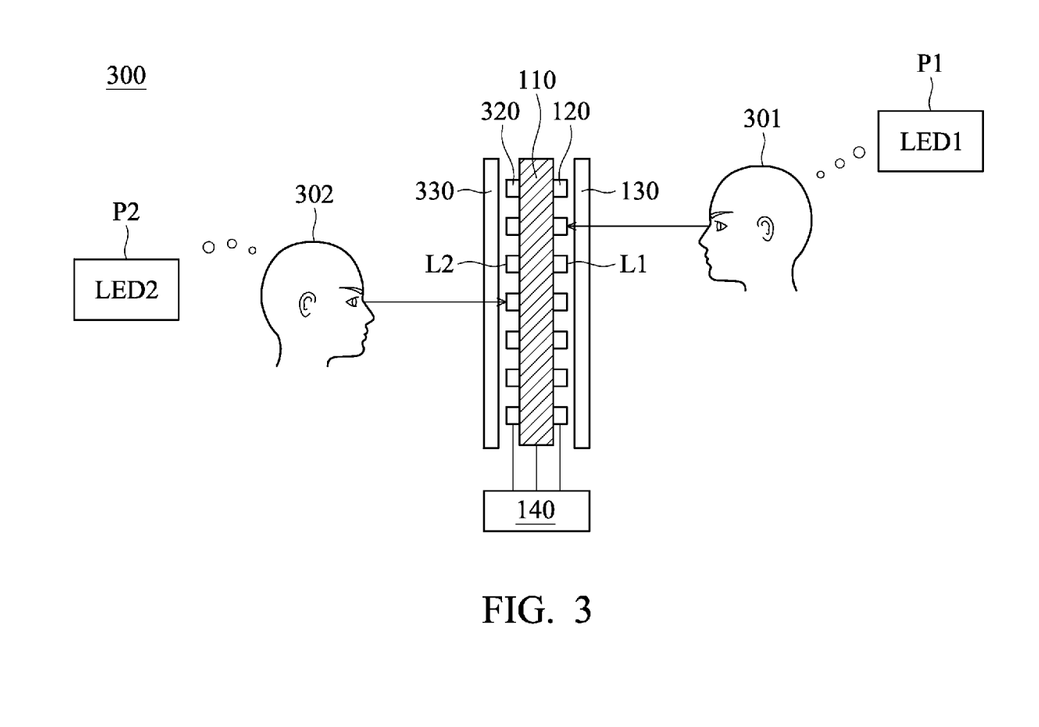
FIG. 3 is a cross-sectional view of a light-emitting module in accordance with another exemplary embodiment of the present invention.

FIG. 3 illustrates a cross-sectional view of a light-emitting module 300 in accordance with another exemplary embodiment of the present invention. The light-emitting module 300 includes: the liquid-crystal module 110, the LED component 120, the transparent cover plate 130 and the control circuit 140, wherein the light-emitting module 300 further includes the LED component 320 and the transparent cover plate 330. According to the theory of persistence of vision mentioned above, during the working process of the light-emitting module 300, the viewer at two sides of the light-emitting module 300 may see the light L1/L2 emitted from the LED components 120/320 or the patterns P1/P2 shown by the components 120/320 respectively without being mutually disturbed if the light emitted from the LED components 120/320 are synchronously shielded by the liquid-crystal module 110 respectively.

The LED component 320 is substantially the same as the LED component 120. The LED component 320 is disposed on the other side, which is opposite to the LED component 120, of the liquid-crystal module 110. In some embodiments, the LED component 320 is disposed on the transparent substrate 111 (FIG. 2). In some embodiments, the LED component 320 is first disposed on the other substrate, and then the substrate is configured to the side opposite to the LED component 120 of the liquid-crystal module 110.

The transparent cover plate 330 is substantially the same as the transparent cover plate 130. The transparent cover plate 330 is over the LED component 320 such that the LED component 320 is sandwiched between the liquid-crystal module 110 and the transparent cover plate 330. For example, the LED component 320 is sandwiched between the transparent substrate 111 and the transparent cover plate 330. In this embodiment, the control circuit 140 is coupled to the LED component 320 in addition to the liquid-crystal module 110 and the LED component 120 in order to control the on/off frequency of the liquid-crystal module 110 and the light-emitting frequency of the LED components 120/320 in such a manner that the light emitted from the LED components 120 and 320 is synchronously shielded by the liquid-crystal module 110. Thus, the light emitted from the LED components 120 and 320 is respectively observed only by the viewer at the side opposite to the liquid-crystal module 110. That is, the light L1/L2 emitted from the LED components 120/320 is emitted from the side opposite to the liquid-crystal module 110. The light L1 emitted from the LED component 120 or the pattern P1 shown by the LED component 120 is only observed by the viewer 301 which is at the side closer to the LED component 120 but the light L2 emitted from the LED component 320 will not be observed by the viewer 301. Conversely, the light L2 emitted from the LED component 320 or the pattern P2 shown by the LED component 320 is only observed by the viewer 302 which is at the side closer to the LED component 320 but the light L1 emitted from the LED component 120 will not be observed by the viewer 302. Thus, the light emitted from the LED components 120 and 320 or the pattern shown by the LED components 120 and 320 will not interference with each other due to the synchronously light-shielding effect of the liquid-crystal module 110.

In some embodiments, the LED components 120 and 320 may independently show the same pattern or different patterns. In some embodiments, the LED component 120 and 320 may independently have the same light-emitting frequency or different light-emitting frequencies; however, the light emitted from the LED components 120 and 320 is still synchronously shielded by the liquid-crystal module 110.

In some embodiments, only one of the LED components 120 and 320 emits light or shows a pattern. The light-emitting module may work substantially the same as the embodiment which has only one LED component disposed on the liquid-crystal module described above if only one of the LED components emits light or shows a pattern. For example, if only the LED component 120 emits light or shows a pattern, the light L1 emitted from the LED component 120 or the pattern P1 shown by the LED component 120 is observed by the viewer 301 which is at the side closer to the LED component 120. Conversely, the light L1 emitted from the LED component 120 or the pattern P1 shown by the LED component 120 is not observed by the viewer 302 and the viewer 302 may see the scenery behind the liquid-crystal module 110 continuously without being disturbed by the LED component 120. In this embodiment, the on/off frequency of the liquid-crystal module 110 and the light-emitting frequency of the LED component (120 or 320) are at least 16 Hz.

The light-emitting module 300 can be used as or attached to signboards, windows such as French windows, vitrines, or outer walls. For example, the light-emitting module 300 can be used as outer walls; thus, viewers on either sides of the light-emitting module 300 may see the light or the patterns shown by the LED components 120/320 respectively without being mutually disturbed, which results in doubling the runtime of the advertising or the indicating effects.

It should be noted that, in a preferred embodiment, the LED components 120/320 use the unpackaged LED chips (with a thickness about 100-300 μm) as a light source. In comparison with conventional LED package structures (with a thickness larger than 1 mm), the unpackaged LED chips feature a lower cost and smaller thickness, which may significantly reduce the manufacturing cost of the LED components 120/320, and the LED chips with a smaller thickness are suitable to be sandwiched between the liquid-crystal module 110 (the transparent substrate 112)/the transparent cover plate 130 and the liquid-crystal module 110 (the transparent substrate 111)/the transparent cover plate 330.

Figure 4:
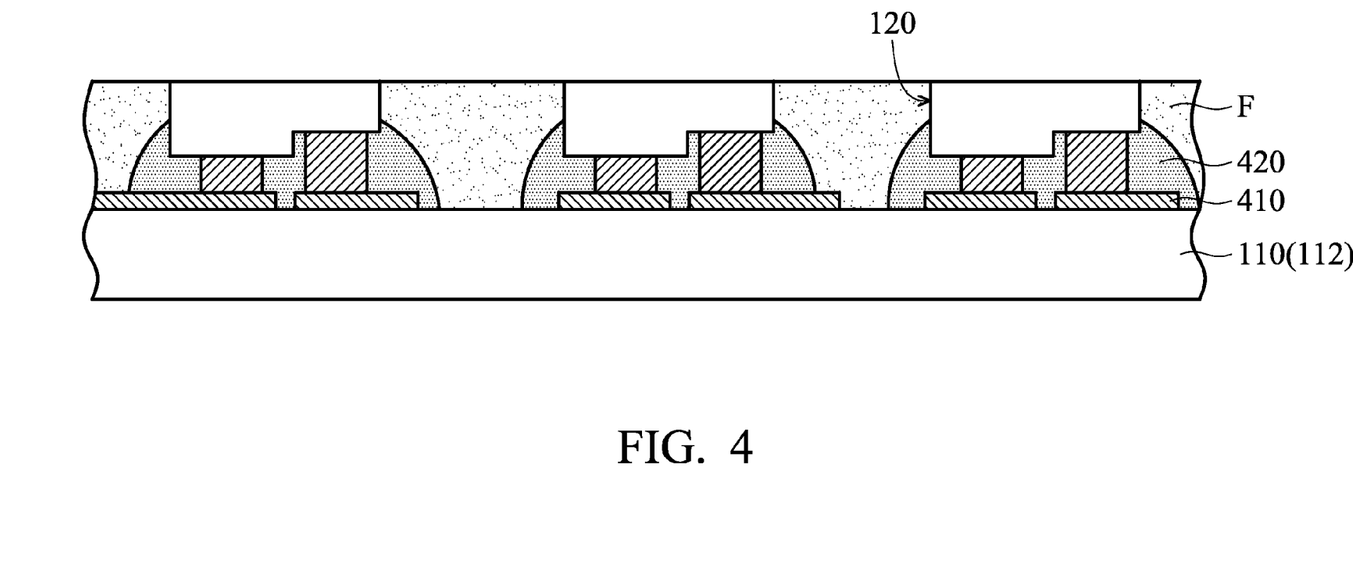
FIG. 4 is a cross-sectional view of part of a light-emitting module in accordance with an exemplary embodiment of the present invention.

If the LED components 120/320 use the unpackaged LED chips as a light source, a wiring layer 410 can optionally be formed between the LED components 120/320 and the liquid-crystal module 110 (please refer to the other application of the Applicant, U.S. patent application Ser. No. 13/567,012, the entirety of which is incorporated by reference herein). For example, as shown in FIG. 4, the wiring layer 410 is disposed on the transparent substrate between the LED component 120 and the liquid-crystal module 110 (for example, on the transparent substrate 112) and the wiring layer 410 so as to electrically connect the LED component 120 to the wiring layer 410. The wiring layer 410 includes metal materials or transparent conductive materials, wherein the metal materials may be Cu and the transparent conductive materials include, for example, indium tin oxide (ITO), indium zinc oxide (IZO), ZnO-based conductive materials, conductive polymer (PEDOT), carbon nanotubes (CNT), very thin metal layer with a thickness not exceeding 1000 Å, very fine metal net with a line width not exceeding 30 μm, or other transparent conductive materials, If the LED components 120/320 use the unpackaged LED chips as a light source, an adhesive layer 420 can be optionally formed between the LED components 120/320 and the liquid-crystal module 110 (please refer to the other application of the Applicant, U.S. patent application Ser. No. 13/567,012, the entirety of which is incorporated by reference herein). For example, as shown in FIG. 4, the adhesive layer 420 is disposed on the transparent substrate between the LED component 120 and the liquid-crystal module 110 (for example, on the transparent substrate 112) to affix LED components 120/320 on the transparent substrate. The adhesive layer 420 includes, for example, transparent insulating paste (e.g. silicone or epoxy resin). In one embodiment, the transparent insulating paste can be mixed with a fluorescent powder F, such that light-emitting modules 100/300 can emit light with a specific color.

Figure 5:
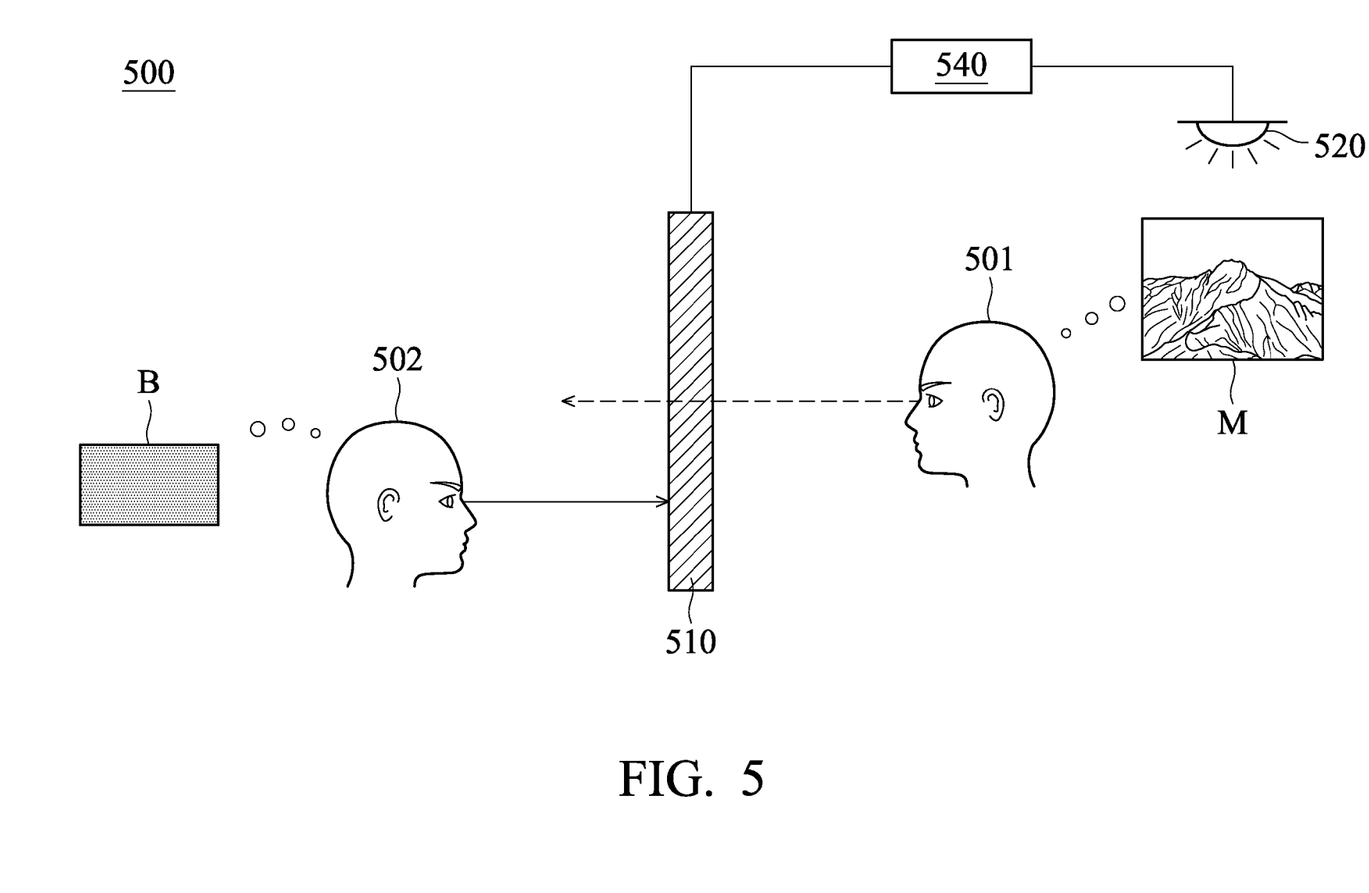
FIG. 5 is a cross-sectional view of a lighting module in accordance with an exemplary embodiment of the present invention.

FIG. 5 illustrates a cross-sectional view of a lighting module 500 in accordance with an exemplary embodiment of the present invention. The lighting module 500 includes: the liquid-crystal module 510, the LED lighting component 520 and the control circuit 540, wherein the LED lighting component 520 of the lighting module 500 and the liquid-crystal module 510 are separated from each other. The control circuit 540 is coupled to the liquid-crystal module 510 and the LED lighting component 520. The control circuit 540 is configured to control the on/off frequency of the liquid-crystal module 510 and the light-emitting frequency of the LED lighting component 520 in such a manner that the light emitted from the LED lighting component 520 is synchronously shielded by the liquid-crystal module 510.

The structure features or materials of the liquid-crystal module 510 are substantially the same as the liquid-crystal module 110, and there is no further description here. The LED lighting component 520 may include any suitable LED lighting structures such as LED bulbs, LED tubes, LED lighting plates or other suitable LED lighting fixtures.

As per the theory of persistence of vision as explained above, when the light emitted from the LED lighting component 520 is synchronously shielded by the liquid-crystal module 510, the viewer 501 at the side of the LED lighting component 520 may have the lighting effect of the LED lighting component 520, and the viewer 501 can see through the liquid-crystal module 510 and see the scenery M behind the liquid-crystal module 510 continuously. The viewer 502 at another side of the liquid-crystal module 510 will not see the light emitted from the LED lighting component 520 and feels that it is dark B behind the liquid-crystal module 510.

In an embodiment, the on/off frequency of the liquid-crystal module 510 and the light-emitting frequency of the LED lighting component 520 are at least 16 Hz.

The LED lighting component 520 of the lighting module 500 can be configured to fit anywhere that needs a lighting source, wherein the liquid-crystal module 510 can be configured to be disposed anywhere that users do not want the light emitted from the LED lighting component 520 to pass through. For example, the liquid-crystal module 510 can be used as or attached to windows such as French windows, vitrines, or outer walls.

For example, the LED lighting component 520 can be placed inside the house as a lighting source, wherein the liquid-crystal module 510 can be used as or attached to the windows such as French windows. Thus, the people inside not only can see through the liquid-crystal module 510 and see the scenery outside, but also have the lighting effect of the LED lighting component 520. Conversely, the people outside cannot see the lighting source of the LED lighting component 520 through the windows due to the synchronously light-shielding effect of the liquid-crystal module 510 and feel that it is a house without illumination, which reaches the purpose of being peep-proof.

Figure 6:
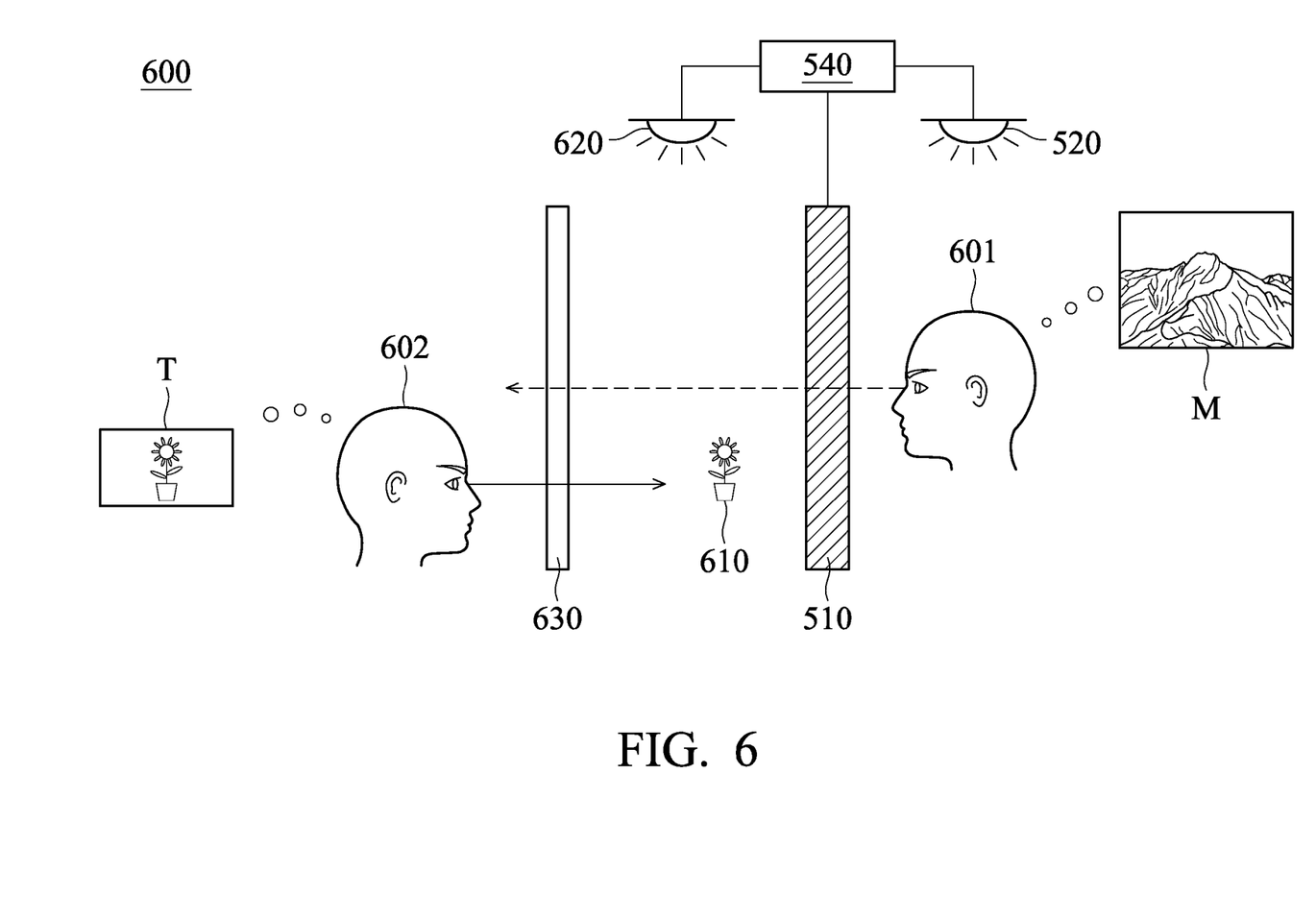
FIG. 6 is a cross-sectional view of a lighting module in accordance with another exemplary embodiment of the present invention.

FIG. 6 illustrates a cross-sectional view of a lighting module 600 in accordance with another exemplary embodiment of the present invention. The lighting module 600 includes: the liquid-crystal module 510, the LED lighting component 520 and the control circuit 540, wherein the lighting module 600 is further includes the LED lighting component 620 and the partition 630. The LED lighting components 520/620 of the lighting module 600 and the liquid-crystal module 510 are separated from each other. The control circuit 540 is coupled to the liquid-crystal module 510 and the LED lighting components 520/620 respectively. The control circuit 540 is configured to control the on/off frequency of the liquid-crystal module 510 and the light-emitting frequency of the LED lighting components 520/620 in such a manner that the light emitted from the LED lighting components 520/620 is synchronously shielded by the liquid-crystal module 510.

The LED lighting component 620 is substantially the same as the LED lighting component 520. The LED lighting component 620 is disposed on the other side, which is opposite to the LED lighting component 520, of the liquid-crystal module 510.

In some embodiments, the LED lighting components 520 and 620 may independently have the same light-emitting frequency or different light-emitting frequencies; however, the light emitted from the LED lighting components 520 and 620 is still synchronously shielded by the liquid-crystal module 510. In an embodiment, the on/off frequency of the liquid-crystal module 510 and the light-emitting frequency of the LED lighting components 520/620 are at least 16 Hz.

The LED lighting components 520/620 of the lighting module 600 can be configured to fit anywhere that needs a lighting source. For example, the LED lighting component 520 can be used as a lighting source of the house and the LED lighting component 620 can be used as a lighting source of a display case. The liquid-crystal module 510 can be configured to fit anywhere that users do not want the light emitted from the LED lighting components 520/620 to pass through. For example, the liquid-crystal module 510 can be used as or attached to windows such as French windows, vitrines, or outer walls.

The partition 630 can be flexible boards or rigid boards. The partition 630 includes glass, polymer or other suitable materials, wherein the polymer is, for example, polymethyl methacrylate (PMMA), silicone, polyethylene terephthalate (PET), or epoxy resin.

The partition 630 is disposed on the liquid-crystal module 510 at the same side as the LED lighting component 620. That is, the partition 630 is disposed on the liquid-crystal module 510 at the side opposite to the LED lighting component 520. In some embodiments, the LED lighting component 620 is disposed between the partition 630 and the liquid-crystal module 510.

As per the theory of persistence of vision as explained above, when the light emitted from the LED lighting components 520/620 is synchronously shielded by the liquid-crystal module 510, the viewer 601 at the side of the LED lighting component 520 may have the lighting effect of the LED lighting component 520. The viewer 601 can see through the liquid-crystal module 510/the partition 630 and see the scenery M behind the liquid-crystal module 510/the partition 630 continuously without seeing the exhibits 610 due to failure to see the light emitted from the LED lighting component 620. (However, the viewer 601 may see the exhibits 610 if there is another light source, for example, sunlight.) On the other hand, the viewer 602 can see the light emitted from the LED lighting component 620 and the exhibits 610 (T) without seeing the light emitted from the LED lighting component 520 and feels that it is dark (B) behind the liquid-crystal module 510.

For example, the LED lighting component 520 can be set inside the house as an indoor lighting source, the liquid-crystal module 510 can be used as or be attached to the windows between the house and the display case, the LED lighting component 620 can be set as the lighting source of the display case and the partition 630 is the partition between the display case and the viewer. Thus, the indoor viewer not only have the lighting effect of the LED lighting component 520 but also can see through the liquid-crystal module 510/the partition 630 and see the scenery M outside the house without seeing the light emitted from the LED lighting component 620 and the exhibits 610 due to the synchronously light-shielding effect of the liquid-crystal module 510. However, the outdoor viewer can see the light emitted from the LED lighting component 620 and the exhibits 610 without seeing the light emitted from the LED lighting component 520 and the indoor status due to the synchronously light-shielding effect of the liquid-crystal module 510.

It should be noted that the light-emitting module and the lighting module including the liquid-crystal module and the LED component described herein is distinctly different from the LED-backlight liquid-crystal display (LED-backlight LCD). The LED is used as the backlight source of the LED-backlight LCD such that the light source goes through the LCD with a penetration ratio controlled by the LCD and then forms the images being seen by users. Therefore, in the LED-backlight LCD, the light is emitted from the LED backlight toward the LCD with a part of the light being shielded or filtered by the LCD such that the light penetrated from the LCD forms an images at the side opposite to the LED backlight.

On the other hand, the LED component of the light-emitting module and the lighting module of the present application is used for the purpose of advertising, indicating or illumination, and the liquid-crystal module is used to shield the light emitted from the LED component to prevent somewhere do not need the light from being influenced by the light. Therefore, all the light emitted from the LED component can be substantially shielded by the liquid-crystal module of the present application (i.e. there is substantially no light that penetrates through the liquid-crystal module to the side opposite to the LED component) such that the LED component only performs the illumination function or forms an image at the side opposite to the liquid-crystal module.

Figure 7:
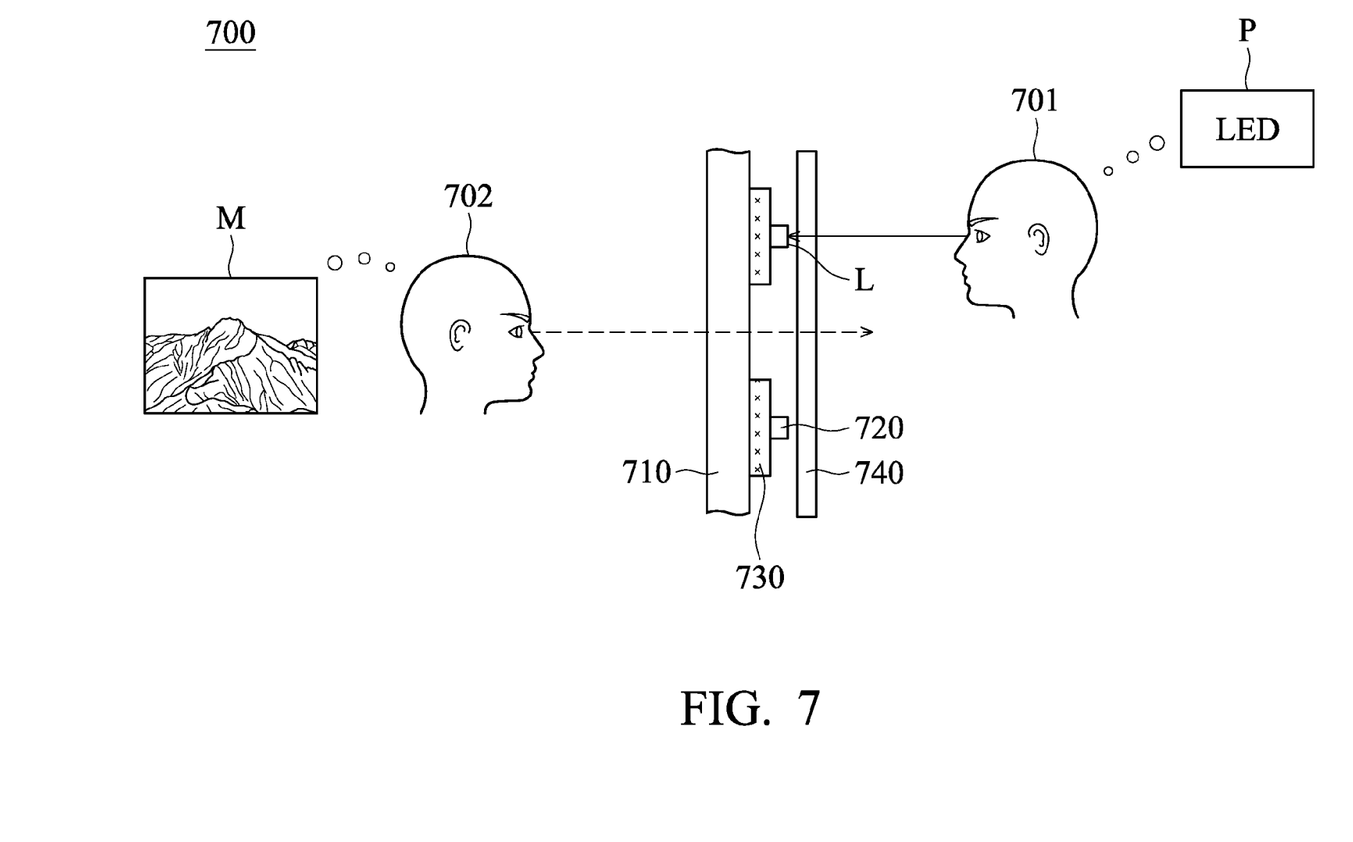
FIG. 7 is a cross-sectional view of a lighting module in accordance with an exemplary embodiment of the present invention, wherein the lighting module comprises DBRs.

FIG. 7 is a cross-sectional view of a lighting module in accordance with another exemplary embodiment of the present invention, wherein the lighting module includes distributed Bragg reflectors (DBRs). The light-emitting module 700 includes: the transparent substrate 710, the LED component 720, the DBR 730 and the transparent cover plate 740, wherein the DBR 730 is used to shield the light emitted from the LED component 720. Therefore, during the working process of the light-emitting module 700, the light L emitted from the LED component 720 or the pattern P shown by the LED component 720 can be observed by the viewer 701 which is closer to the side of the LED component 120. The viewer 702 which is closer to a side of the DBR 730 (i.e. which is closer to the side opposite to the LED component 720) may not see the light L emitted from the LED component 720 or the pattern P shown by the LED component 720; however, the viewer 702 may see the scenery M behind the light-emitting module 700 continuously without being disturbed by the light emitted from the LED component 720.

The transparent substrate 710 is substantially the same as the transparent substrates 111/112. The transparent cover plate 710 can be flexible boards or rigid boards. The transparent cover plate 710 includes glass, polymer or other suitable materials, wherein the polymer is, for example, polymethyl methacrylate (PMMA), silicone, polyethylene terephthalate (PET), or epoxy resin.

The LED component 720 is disposed on the transparent substrate 710. The LED component 720 is substantially the same as the LED components 120/320. The LED component 720 may include packaged LED chips, unpackaged LED chips or other suitable LED structures (please refer to the other application of the Applicant, U.S. patent application Ser. No. 13/567,012, the entirety of which is incorporated by reference herein.).

The incident light forms constructive interference due to the periodic variation of the refractive index of the DBR 730 and results in an effective reflective index. In some embodiments, the DBR 730 can be a periodic structure including two alternating material layers with different refractive index or a dielectric waveguide with the effective reflective index varied periodically.

As shown in FIG. 7, the DBR 730 is disposed between the LED component 720 and the transparent substrate 710. In some embodiments, the DBR 730 is a whole layer set on the transparent substrate 710. In some embodiments, the DBR 730 is set on the transparent substrate 710 partially. Because the visual angle of the LED is not large, the total internal reflection can be achieved if the area of the DBR is 2-3 times larger than the area of the LED component. In some embodiments, the DBR 730 is disposed partially between the LED component 720 and the transparent substrate 710, wherein the area of the DBR 730 is 1 times larger than the area of the LED component 720.

In general, the thickness of each DBR layer is ¼ of the center wavelength of the reflected wave, which has effective reflection on the wave with the wavelength close to 4 times of the thickness of the DBR layer. Therefore, the center wavelength of the DBR can be set as the major wavelength of the LED and then adjust the thickness of each DBR layer accordingly.

In some embodiments, the DBR 730 can be a DBR for shielding the red, green or blue light or a combination thereof. In some embodiments, the DBR 730 can be a triple-layered structure composed of the DBR for shielding the red, green and blue light.

Because the range of most full width half maximum (FWHM) of the LEDs are 10-30 nm, the light emitted from the LEDs can be shielded effectively by the DBRs which only shield the light of this range. In some embodiments, only the light with the FWHM smaller than 40 nm is shielded by the DBR 730.

In some embodiments, the DBR 730 may include a first DBR material (not shown) and a second DBR material (not shown), and a DBR stack is formed by an alternating arrangement of the two (i.e. each of the DBR stack includes a layer of the first DBR material and a layer of the second DBR material). For example, the first DBR material includes silicon oxide ($SiO_2$) and the second DBR material includes silicon nitride ($Si_3N_4$).

In some embodiments, the number of DBR stacks can be more than 3, more than 5 or more than 10. In some embodiments, the number of DBR stacks is between 5 and 10. In some embodiments, the optical reflection of the DBR 730 can be greater than 80%.

The transparent cover plate 740 is disposed over the LED component 720 such that the LED component 720 is sandwiched between the transparent substrate 710 and the transparent cover plate 740. The transparent cover plate 740 is substantially the same as the transparent cover plates 130/330. The transparent cover plate 740 can be flexible boards or rigid boards. The transparent cover plate 740 includes glass, polymer or other suitable materials, wherein the polymer is, for example, polymethyl methacrylate (PMMA), silicone, polyethylene terephthalate (PET), or epoxy resin.

Figure 8:
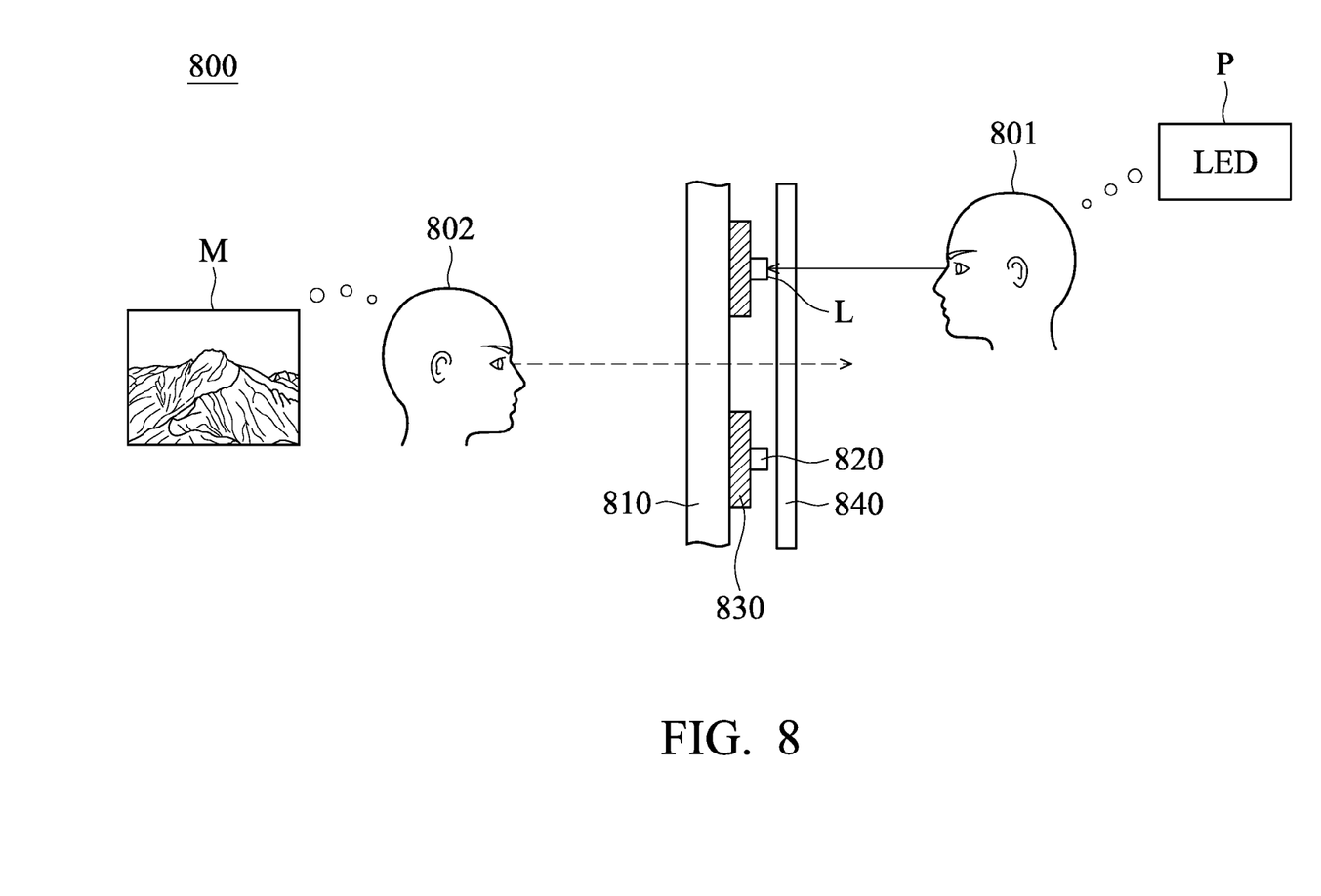
FIG. 8 is a cross-sectional view of a lighting module in accordance with an exemplary embodiment of the present invention, wherein the lighting module comprises a reflective coating layer.

FIG. 8 is a cross-sectional view of a lighting module in accordance with an exemplary embodiment of the present invention, wherein the lighting module comprises a reflective coating layer. The light-emitting module 800 is substantially the same as the light-emitting module 700. The light-emitting module 800 includes: the transparent substrate 810, the LED component 820 and the transparent cover plate 840; however, the light-emitting module 800 replaces the DBR 730 with the reflective coating layer 830 to shield the light emitted from the LED component 820. There is no further description about the other similar structures here.

Therefore, during the working process of the light-emitting module 800, the light L emitted from the LED component 820 or the pattern P shown by the LED component 820 can be observed by the viewer 801 which is closer to the side of the LED component 820. The viewer 802 which is closer to a side of the reflective coating layer 830 (i.e. which is closer to the side opposite to the LED component 820) may not see the light L emitted from the LED component 820 or the pattern P shown by the LED component 820; however, the viewer 802 may see the scenery M behind the light-emitting module 800 continuously without being disturbed by the light emitted from the LED component 820.

The reflective coating layer 830 may include any suitable coating layer which is capable of reflecting the light emitted from the LED component 820. In some embodiments, the reflective coating layer 830 is disposed partially between the LED component 820 and the transparent substrate 810, wherein the area of the reflective coating layer 830 is at least 2 times larger than the area of the LED component 820. In some embodiments, the reflective coating layer 830 includes a metal coating layer, wherein the metal coating layer includes metal, alloy, metal oxide or metal nitride, etc. For example, the metal coating layer includes: Al, Au, Ag, Ti, Cu . . . , and the alloys thereof; the metal oxide includes zinc oxide, tin oxide and niobium oxide; the metal nitride includes titanium nitride, chromium nitride and titanium tungsten nitride ($Ti_xW_yN_z$).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light-emitting module, comprising:
a liquid-crystal module comprising:
a pair of transparent substrates; and
a liquid-crystal layer disposed between the pair of transparent substrates;
a light-emitting diode (LED) component disposed on a first side of the liquid-crystal module;
a transparent cover plate over the LED component such that the LED component is sandwiched between the liquid-crystal module and the transparent cover plate; and
a control circuit configured to control an on/off frequency of the liquid-crystal module and a light-emitting frequency of the LED component in such a manner that light emitted from the LED component is synchronously shielded by the liquid-crystal module, wherein ambient light is able to transmit through the light-emitting module when the liquid-crystal module is in an on-state.

2. The light-emitting module as claimed in claim 1, wherein each of the on/off frequency and the light-emitting frequency is at least 16 Hz.

3. The light-emitting module as claimed in claim 1, further comprising:
a set of electrode layers between the pair of transparent substrates and the liquid-crystal layer; and
a set of alignment layer between the set of electrode layers and the liquid-crystal layer.

4. The light-emitting module as claimed in claim 1, further comprising:
a set of polarizers on an outer surface of the pair of transparent substrates.

5. The light-emitting module as claimed in claim 1, wherein the LED components consist of unpackaged light emitting diode chips.

6. A light-emitting module, comprising:
a liquid-crystal module comprising:
a pair of transparent substrates; and
a liquid-crystal layer disposed between the pair of transparent substrates;
a first light-emitting diode (LED) component disposed on a first side of the liquid-crystal module;
a first transparent cover plate over the first LED component such that the first LED component is sandwiched between the liquid-crystal module and the first transparent cover plate;
a control circuit configured to control an on/off frequency of the liquid-crystal module and a first light-emitting frequency of the first LED component in such a manner that light emitted from the first LED component is synchronously shielded by the liquid-crystal module;
a second LED component disposed on a second side of the liquid-crystal module opposite to the first side; and
a second transparent cover plate over the second LED component such that the second LED component is sandwiched between the liquid-crystal module and the second transparent cover plate; and
wherein the control circuit is further configured to control a second light-emitting frequency of the second LED component in such a manner that the light emitted from the first LED component and the second LED component are synchronously shielded by the liquid-crystal module.

7. The light-emitting module as claimed in claim 6, wherein the first LED component and the second LED component independently show the same pattern or different patterns.

8. The light-emitting module as claimed in claim 6, wherein the light emitted from each the first LED component and the second LED component is emitted away from the liquid-crystal module.

9. The light-emitting module as claimed in claim 6, wherein the LED components consist of unpackaged light emitting diode chips.

10. The light-emitting module as claimed in claim 6, further comprising:
at least a wiring layer between the pair of transparent substrates and the first LED component or disposed between the pair of transparent substrates and the second LED component; and
at least an adhesive layer between the pair of transparent substrates and the first LED component or disposed between the pair of transparent substrates and the second LED component to affix the light emitting diode chips on the transparent substrate.

11. The light-emitting module as claimed in claim 10, further comprising:
a fluorescent powder doped in the adhesive layer.

12. The light-emitting module as claimed in claim 6, wherein ambient light is able to transmit through the light-emitting module via the liquid-crystal module when the liquid-crystal module is in an on-state.

13. A lighting module, comprising:
a transparent liquid-crystal module comprising:
a pair of transparent substrates; and
a liquid-crystal layer disposed between the pair of transparent substrates;
a first light-emitting diode (LED) lighting module disposed at a first side of the transparent liquid-crystal module, wherein the transparent liquid-crystal module and the first LED lighting module are spaced apart in an open space to be illuminated by the first LED lighting module; and
a control circuit configured to control an on/off frequency of the transparent liquid-crystal module and a first light-emitting frequency of the first LED lighting module in such a manner that the light emitted from the first LED lighting module is synchronously shielded by the transparent liquid-crystal module.

14. The lighting module as claimed in claim 13, further comprising:
a second LED lighting module disposed at a second side of the transparent liquid-crystal module opposite to the first side of the transparent liquid-crystal module, wherein the transparent liquid-crystal module and the second LED lighting module are spaced apart in an open space to be illuminated by the second LED lighting module;
wherein the control circuit further is configured to control a second light-emitting frequency of the second LED lighting module in such a manner that the light emitted from the first LED lighting module and the second LED lighting module are synchronously shielded by the transparent liquid-crystal module.

15. The lighting module as claimed in claim 14, further comprising:
a partition on the second side such that the second LED lighting module is disposed between the partition and the transparent liquid-crystal module.

16. The lighting module as claimed in claim 14, wherein each of the on/off frequency, the first light-emitting frequency and the second light-emitting frequency is at least 16 Hz.

17. The lighting module as claimed in claim 13, further comprising:
a set of electrode layers between the pair of transparent substrates and the liquid-crystal layer;
a set of alignment layer between the set of electrode layers and the liquid-crystal layer.

18. The lighting module as claimed in claim 13, further comprising:
a set of polarizers on an outer surface of the pair of transparent substrates.

19. The lighting module as claimed in claim 13, wherein the transparent liquid-crystal module is used as or attached to a window or outer wall.

20. The lighting module as claimed in claim 13, wherein ambient light is able to transmit through the light-emitting module via the transparent liquid-crystal module when the transparent liquid-crystal module is in an on-state.

* * * * *